(12) United States Patent  
Whitcomb (10) Patent No.: US 7,774,981 B2  
(45) Date of Patent: Aug. 17, 2010

(54) PLANT CONTAINER AND METHOD

(75) Inventor: Carl E. Whitcomb, Stillwater, OK (US)

(73) Assignee: Lacebark, Inc., Stillwater, OK (US)

( * ) Notice: Subject to any disclaimer, the term of this patent is extended or adjusted under 35 U.S.C. 154(b) by 497 days.

(21) Appl. No.: 11/673,406

(22) Filed: Feb. 9, 2007

(65) Prior Publication Data

US 2008/0190022 A1    Aug. 14, 2008

(51) Int. Cl.  
*A01G 9/02* (2006.01)

(52) U.S. Cl. .......................................................... 47/73

(58) Field of Classification Search .................. 47/65.5, 47/65, 32.7, 32.8, 86, 87, 73, 66.7, 77; D11/143, D11/144–154, 155, 156  
See application file for complete search history.

(56) References Cited

U.S. PATENT DOCUMENTS

| 754,948 | A | | 3/1904 | White | |
|---|---|---|---|---|---|
| 1,011,445 | A | | 12/1911 | Killion | |
| 1,845,522 | A | | 2/1932 | Rowley | |
| 2,405,056 | A | | 7/1946 | Rosenbloom | |
| 2,615,486 | A | | 10/1952 | Marcus | |
| 2,829,742 | A | | 4/1958 | Wallace | |
| 3,288,340 | A | * | 11/1966 | Shapiro et al. | 206/519 |
| 3,291,437 | A | | 12/1966 | Bowden et al. | |
| D215,122 | S | | 9/1969 | Satake | |
| 3,951,294 | A | | 4/1976 | Wilson | |
| 4,442,628 | A | * | 4/1984 | Whitcomb | 47/65.5 |

(Continued)

FOREIGN PATENT DOCUMENTS

WO      WO9700005      1/1997

(Continued)

OTHER PUBLICATIONS

Carl Erwin Whitcomb, "Effects of Root Competition Between Trees and Turfgrass", An Abstract of a Dissertation submitted to the Graduate Faculty in Partial Fulfillment of the Requirements for the Degree of Doctor of Philosophy, P- 1-3, 52.

(Continued)

*Primary Examiner*—Timothy D Collins  
*Assistant Examiner*—Michael Kreiner  
(74) *Attorney, Agent, or Firm*—Jeffrey L. Streets; Streets & Steele (57) ABSTRACT

The invention includes an improved container and method for growing a plant to be subsequently transplanted. In one embodiment, an upwardly extending container wall is adapted for retaining soil. A plurality gutters are disposed on an interior portion of the container wall. The gutters extend along the container wall to one or more openings, thereby guiding roots to the openings for air pruning the roots. A root guiding surface of the gutter may extend downwardly and outwardly to the container wall, to form a substantially v-shaped gutter. Alternatively, an upwardly extending lip may be disposed on an inner portion of the root guiding surface, forming a substantially u-shaped gutter between the lip, ledge, and the interior portion of the container wall. The gutters may also slope downward in a direction along the container wall to better accommodate the geotropic nature of plant roots. An upwardly extending finger may also be disposed on the container wall above each gutter, to guide roots to the nearest opening.

35 Claims, 5 Drawing Sheets

U.S. PATENT DOCUMENTS

| | | | |
|---|---|---|---|
| 4,497,132 | A | 2/1985 | Whitcomb |
| 4,510,712 | A | 4/1985 | Whitcomb |
| 4,574,522 | A | 3/1986 | Reiger et al. |
| 4,716,680 | A | 1/1988 | Whitcomb et al. |
| 4,730,953 | A | 3/1988 | Tarko |
| 4,753,037 | A * | 6/1988 | Whitcomb ............... 47/73 |
| 4,920,695 | A | 5/1990 | Garden |
| 4,939,865 | A | 7/1990 | Whitcomb et al. |
| 5,099,607 | A | 3/1992 | Lawton |
| 5,241,784 | A | 9/1993 | Henry |
| 5,301,465 | A | 4/1994 | Caferro |
| 5,327,679 | A | 7/1994 | Hawthorne |
| 5,459,960 | A * | 10/1995 | Manlove .............. 47/65.5 |
| 5,557,886 | A * | 9/1996 | Whitcomb ............... 47/73 |
| 5,768,825 | A | 6/1998 | Reiger |
| 6,195,938 | B1 | 3/2001 | Kay |
| 6,311,443 | B1 | 11/2001 | Allazetta |
| 6,453,610 | B2 | 9/2002 | Tonkin et al. |
| 6,481,593 | B2 | 11/2002 | Banhagel |
| 6,862,840 | B1 | 3/2005 | Single |
| 6,874,278 | B2 | 4/2005 | Felknor et al. |
| 7,210,266 | B2 * | 5/2007 | Henry et al. ............ 47/73 |
| 2003/0192239 | A1 * | 10/2003 | Rogers ................ 47/65.5 |
| 2004/0237390 | A1 * | 12/2004 | Clop .................. 47/32.7 |

FOREIGN PATENT DOCUMENTS

| | | |
|---|---|---|
| WO | WO9721339 | 6/1997 |
| WO | WO0135722 A1 | 5/2001 |

OTHER PUBLICATIONS

Carl E. Whitcomb, Eliot C. Roberts, and Roger Q. Landers, A Connecting Pot Technique for Root Competition Investigations Between Woody Plants or Between Woody and Herbaceous Plants, Ecology, vol. 50, No. 2, Early Spring 1969, P- 326-328.

Carl E. Whitcomb and Eliot C. Roberts, "Competition Between Established Tree Roots and Newly Seeded Kentucky Bluegrass", Agronomy Journal, vol. 65, Jan.-Feb. 1973, p. 126-129.

Ralph Reiger and Carl E. Whitcomb, "A Root Control System for Growing and Transplanting Trees", Ag Exp Sta Report, P-843, 1983.

Carl Whitcomb, "Fabric liners to stop root circling in containers", unavailable paper published in 1983, but referenced on, p. 341-342 of book by Carl Whitcomb, Plant Production in Containers II, 2003.

Carl E. Whitcomb, "Root Development of Trees Grown in Field-Grow Fabric Containers Following Transplanting", Okla. State U. Ag Exp. Sta Research Report, P-872, 1985.

Paper: Published in 1968 or 1969 Subject: Using quart milk cartons with or without bottoms removed for growing tree seedlings. The milk cartons were positioned on a raised wire frame to prevent roots from growing into the soil below. This may have been the first situation where air-root-pruning occurred.

Jim Ward and Carl E. Whitcomb, Nursery Problems Solutions Through Research, Jun. 21, 1972, Experiment #13, "Effects of Time of Potting and Root Pruning on Growth and Root Distribution of Loquat Seedlings", P-24-25.

Carl E. Whitcomb, "Growth of Carissa Grandiflora 'Boxwood Beauty' in varying media, containers and micronutrient levels", 9 pages, circa 1971.

Carl E. Whitcomb, Experiment #14, "Effects of Container Sidewall Porosity, Growing Media and Presence or Absence of Micronutrient Fertilizer on Root and Top Growth of Carissa Grandiflora Var. Boxwood Beauty", Nursery Problems Solutions Through Research, Jun. 5, 1971.

Randy E. Davis and Carl E. Whitcomb, "Effects of Propagation Container Size on Development of High Quality Seedlings", Reprint from the International Plant Propagators' Society, vol. 25, 1975.

Robert S. Birchell and Carl E. Whitcomb, "Effects of Container Design on Root Development and Regeneration", Nursery Research Field Day, Ag Exp Sta, OK State Univ, Oct. 1977, Research Report P-760.

Robert D. Hathaway and Carl E. Whitcomb, "The Effects of Root Malformation During Propagation on Growth and Survival of Bur Oak", Nursery Research Field Day, Ag Exp Sta, OK State Univ, Oct. 1978, Research Report P-777.

Sancho Dickinson and Carl E.Whitcomb, "Effects of Container Design on Root Quality", Nursery Research Field Day, Ag Exp Sta, OK State Univ, Oct. 1978, Research Report P-777.

Elizabeth Williams and Carl E. Whitcomb, "Effects of Growing Media and Container Design on Growth of Tree Seedlings", Nursery Research Field Day, Ag Exp Sta, OK State Univ, Oct. 1979, Research Report P-791.

John D. Gibson and Carl E. Whitcomb, "Producing Tree Seedlings in Square Bottomless Containers", Ornamentals South, Aug. 1980, P-12-15.

Carl E. Whitcomb, "Effects of Container and Production Bed Color on Root Temperatures and Plant Growth", Nursery Research Field Day, Ag Exp Sta, OK State Univ, Oct. 1980, Research Report P-803.

Steve Wall and Carl E. Whitcomb, "A Comparison of Commercial Containers for Growing Tree Seedlings", Nursery Research Field Day, Ag Exp Sta, OK State Univ, Oct. 1980, Research Report P-803.

Carl E Whitcomb, "Growing Tree Seedlings in Containers", Bulletin 755 Jan. 1981 Agricultural Experiment Station Div of Ag, OK State Univ, P-18.

Carl E. Whitcomb, "An "Easy" Way to Grow Specimen Trees in the Field", Nursery Research Field Day, Ag Exp Sta, OK State Univ, Oct. 1981, Research Report P-818.

Carl E. Whitcomb, "A Vertical Air-Root-Pruning Container", Reprints- vol. 31 International Plant Propagators Society Combined Proceedings for 1981, P-591-596.

Carl E. Whitcomb, "Inproving Root System Quality", Reprint from Research Report p-829 of the OK Ag Exp. Sta. Oct. 1982.

Ben Davis III and Carl E. Whitcomb, "Growing Pecan Seedlings in Containers", Reprint from Research Report P-829 of the OK Ag. Exp. Sta. Oct. 1982.

Robert D. Hathaway and Carl E. Whitcomb, Nutrition and Performance of Container-Grown Japanese Black Pine Seedlings, J. Environ. Hort. 2 (1):9-12. Mar. 1984.

Robert D. Hathaway and Carl E. Whitcomb, "Container-Grown Pecan Seedlings Good Nutrition, Root Pruning Technique to Get Seedlings Off to Quick Start", Pecan South, Jan. 1985, P-14-19.

Carl E. Whitcomb, Roots for the Future, the International Plant Propagators' Society, Combined Proceedings vol. 39, 1989, P-170-173.

Dr. Carl Whitcomb, "The Rootmaker Container", Florida Nurseryman Oct. 1989, P-23-29.

"Container designed to aid plant's root development", Nursery Manager, Apr. 1991, P-22.

Carl E. Whitcomb, "Top Ten Points of Plant Propagation", Combined Proceedings International Plant Propagators' Society, vol. 48, 1988, P-558-561.

Carl E. Whitcomb, "Avoiding the Staking Delemma", published in the International Plant Propagators Soc. Proceedings, vol. 50, 2000.

Carl Whitcomb, "Seedling Development: The Critical First Days ©", Combined Proceedings International Plant Propagators' Society, vol. 51, 2001 P-610-614.

Carl E. Whitcomb, Containers vs. Poly Bags- Which are better?, Reprinted from the Jan. 1, 1983, container production special issue of American Nurseryman.

Carl E. Whitcomb and Jerry D. Williams, "Stair-step Container for Improved Root Growth", HortScience 20(1) 66-67, 1985.

Dr. C. E. Whitcomb, "Effects of pot sizes on rooting of juniper cuttings", Jan. 15, 1974, P-15, 73-74.

James D. Ward and Carl E. Whitcomb, "Nutrition of Japanese Holly during Propagation and Production", J. Amer. Soc. Hort. Sci 104(4)P-:523-526. 1979.

Carl E. Whitcomb, "Effect of Micronutrient Nutrition During Propagaton ON Container Plant Production", Reprints vol. 30 International Plant Propagators' Society Combined Proceedings for 1980, P-468-473.

Carl E. Whitcomb, Allan Storjohann and William D. Warde, "Micromax—Micronutrients for Improved Plant Growth", Reprints vol. 30 International Plant Propagators' Society Combined Proceedings for 1980, P-462-467.

Carl E. Whitcomb, Ralph Reiger and Mike Hanks, "Growing Trees in Wire Baskets", Journal of Ariculture 7 (6): Jun. 1981, P-158-160.

Frank E. Babcock and Carl E. Whitcomb, "N-P-K Effects on Tree Seedling Growth", Agriculture Exp. Sta. OK State University Research Report P-843, 1983.

Carl E. Whitcomb, "Why Large Trees Are Difficult to Transplant", Journal of Arboriculture 9(2): Feb. 1983, P-57-58.

Michael Carney and Carl E. Whitcomb, "Effects of 2 Slow-Release Fertilizers on the Propagation and Subsequent Growth of 3 Woody Plants", J. Environ. Hort. 1(3):P-55-58, Sep. 1983.

Bonnie Lee Appleton and Carl E. Whitcomb, "Effects of Container Size and Transplanting Date on the Growth of Tree Seedlings", J. Environ. Hort. 1(4)P-89-93. Dec. 1983.

C. Chris Threadgill, Carl e. Whitcomb and Ronald McNew, "Effects of Propagation Container Dimensions and Media on the Growth of 4 Nursery Crops", J. Environ. Hort. 3(3):P-126-131 Sep. 1985.

Carl Whitcomb PhD., "The Obsolete Taproot"; Landscape Contractor vol. 7, #8, pp. 22, 66, 67, Aug. 2004.

Carl E. Whitcomb and Andy C. Whitcomb; "Solutions for Pot-in-Pot Root Escape, Root Circling and Heat Shock at Harvest"; The International Plant Propagators Society Proceedings, 2004, vol. 54.

Whitcomb, Carl E. "Plant Production in Containers", copyright 1984 by Carl E. Whitcomb, revised 1988, pp. 1-175.

Whitcomb, Carl E. "Plant Production in Containers", copyright 1984 by Carl E. Whitcomb, revised 1988, pp. 176-629.

Whitcomb, Carl E. "Plant Production in Containers II", copyright 1984 by Carl E. Whitcomb, revised 1988 and 2003, pp. 1-247.

Whitcomb, Carl E. "Plant Production in Containers II", copyright 1984 by Carl E. Whitcomb, revised 1988 and 2003, pp. 248-765.

Whitcomb, Carl E. "Plant Production in Containers II", copyright 1984 by Carl E. Whitcomb, revised 1988 and 2003, pp. 766-1129.

* cited by examiner

PLANT CONTAINER AND METHOD

BACKGROUND OF THE INVENTION

1. Field of the Invention

The present invention relates generally to plant growing methods and containers, and particularly to methods and containers for air-root-pruning of growing plants intended to be transplanted.

2. Description of the Related Art

Landscape plants and other plants intended to be transplanted have, for some time, been grown out-of-doors in containers above ground. Container-grown plants can be grown at a faster rate than those grown in the field, and because the roots of container plants are not severed or otherwise disturbed when the plants are transplanted, such transplanting can take place at any time during the year, not just during the early spring as required with bare root or bagged nursery stock.

A variety of containers for growing plants intended to be transplanted have been developed and used previously, beginning with metal cans having drainage openings punched in the bottoms and progressing to present-day plastic containers. However, plants grown in conventional containers, especially woody plants, commonly experience problems such as spiral root growth and generally downward root orientation with little lateral root development.

In some containers having open bottoms, the roots are air-pruned when they reach the bottom, wherein the portion of each root extending into the air is killed by desiccation. However, the root tips are still at the bottom of the container rather than being laterally directed along the sides. It has been shown that the root growth of container-grown plants after being transplanted primarily involves the extension of roots which were present in the container at the time of transplanting as opposed to the development of new roots. Consequently, the number and the position of root tips present at the time of transplanting is very important to the rapid establishment, and frequently the ultimate survival, of container-grown plants.

In the typical root growth of a germinating seed in a container, a tap root forms first and quickly grows to the bottom of the container where it changes direction along the profile of the container. The tap root continues to grow unless it becomes physically trapped or exits the container and is air-pruned. Once the tap root growth is terminated, either by trapping or air pruning, the apical dominance of the root tip is lost and the development of secondary lateral roots occurs along the length of the tap root. The secondary lateral roots generally grow outwardly towards the sides of the container and slightly downwardly according to the geotropic nature of plant roots. When the lateral roots contact the sides of the container, they grow downwardly towards the bottom of the container where they may continue to follow the shape of the container, such as growing in a circular pattern in a circular container, unless their growth is terminated as a result of being physically trapped or air-pruned. When plants having this type of root growth are transplanted, the downwardly orientated roots at the bottom of the root growth provide little or no lateral anchorage. Also, the root tips may be at a depth in the soil where aeration is less favorable. In addition, the downwardly orientated roots are intermingled with each other and exert pressure on one another as the roots increase in diameter with age. This pressure restricts the normal flow of water and nutrients from the root tips to the top of the plant, as well as the downward flow of energy from the leaves.

Landscape plants have sometimes been grown in bottomless, square containers placed on wire surfaces, whereby roots reaching the bottom of the container are air-pruned. However, most of the root tips that are produced will undesirably end up at the bottom of the container. Also, the requirement of placing the containers on wire screen surfaces generally makes the practice uneconomical. Furthermore, such open bottom containers are not easily moved without spilling or losing growth medium contained therein.

More recently, containers have been developed for controlling spiral root growth whereby the root tips are physically trapped by surfaces in the container so that the roots are prevented from elongating, or the circling root tips are caused to pass through vertical openings in the sides of the container whereby the root tips are air-pruned. An example of the root tip trapping type of container is described in U.S. Pat. No. 4,442,628 (Whitcomb) issued Apr. 17, 1984. An example of a container having vertical side wall openings that air prune circling roots is described in U.S. Pat. No. 4,497,132 (Whitcomb) issued Feb. 5, 1985. While such root-tip-trapping and air-root-pruning containers have been utilized successfully, some spiral root growth can still take place and the development of lateral root tips has been less than optimum.

Therefore, there is a need for an improved container for growing plants intended to be transplanted. Such an improved container should prevent spiral root growth to an even greater degree than existing containers. It would be desirable if the improved container enhanced the development of lateral roots and branched root tips along and around the sides of the container.

SUMMARY OF THE INVENTION

The present invention provides an air root pruning container for growing a plant. The container comprises an upwardly extending container side wall connected to a bottom wall. The side wall comprises at least one upwardly facing internal ledge following an undulating path along the interior of the container side wall, a plurality of upwardly extending internal ribs spaced-apart along the container side wall above the ledge, and a plurality of openings through the container side wall in communication with low points in the undulating path of the ledge. Preferably, the plurality of upwardly extending internal ribs extend upwardly from the ledge. More preferably, the plurality of upwardly extending internal ribs extend upwardly from the ledge at the high points in the undulating path of the ledge. The ledge may optionally slope continuously downwardly away from each of the ribs until coming into communication with at least one of the plurality of openings. In one embodiment, the upwardly extending internal ribs have two legs forming a peak there between, for example wherein the legs of the upwardly extending ribs have a greater longitudinal slope than the ledge or wherein the legs of the upwardly extending ribs form an acute angle there between.

In one preferred embodiment, the container side wall has corners, such as in a rectangular container, and each of the plurality of openings are positioned at the corners. In such an embodiment, it is also preferred that the plurality of upwardly extending internal ribs comprises at least one upwardly extending rib between each corner. Still further, an upwardly extending rib may be disposed in each of the corners. It is also optional, but preferred, that the container is nestedly stackable.

The container may comprise a plurality of the upwardly facing internal ledges in a spaced relationship one above the other. Accordingly, roots may be air root pruned at more than one elevation within the container. It is particularly advantageous that the ledges deter roots from extending down the container side wall and the upwardly extending ribs deter roots from circling the interior of the container side wall. Embodiments having a plurality of upwardly facing internal ledges will preferably include a first ledge and a second ledge that is adjacent and above the first ledge, and wherein the upwardly extending rib of the first ledge extends upwardly to an elevation that is higher than the low point of the second ledge. This arrangement of first and second ledges may be characterized in that there is no horizontal cross-section of the container side wall that does not intersect a ledge or rib. Accordingly, root circling is extremely unlikely to occur.

Another embodiment of the invention provides a ledge that slopes downwardly in a transverse direction toward the upper adjacent portion of the container wall. The ledge preferably slopes downwardly in the transverse direction at an angle of between about 20 to 60 degrees with respect to horizontal, and more preferably between about 35 to 45 degrees with respect to horizontal. A ledge with a transverse slope accommodates more roots than a ledge that is transversely horizontal. Alternatively, the ledge may comprise an upwardly extending lip forming a gutter. A preferred gutter has a width of at least about 3/16" and/or a depth of between about 1/16" to 3/16". Optionally, the lip may be tapered along the length of the ledge. According to the foregoing embodiments, the ledge may have a substantially U-shaped cross section or a substantially V-shaped cross section.

The bottom wall of the container preferably has one or more roof-like peaks to deflect a taproot into a bottom wall opening. To further deter root circling near the bottom wall, the container may further include a plurality of ribs extending upwardly along the container side wall from the bottom wall to an elevation higher than the low point of the adjacent ledge.

Yet another embodiment of the invention provides a container flat for growing plants. The container flat comprises a plurality of joined containers, each container being made in accordance with one of the foregoing embodiments.

DETAILED DESCRIPTION OF PREFERRED EMBODIMENTS

The present invention includes an improved air root pruning container for growing a plant intended to be transplanted. Roots extending in all directions, including the tap root, are air-pruned to foster the development of secondary lateral roots. The secondary lateral roots are air-pruned at several levels along the sides of the container, which promotes further root branching from the lateral roots and maximizes lateral root tip production. Upon transplantation, root tips are present at all levels in the growth medium and oriented to grow roots in all directions around the plant, quickly anchoring the plant and providing rapid absorption of water and nutrients.

The air root pruning container comprises an upwardly extending container side wall connected to a bottom wall. The side wall comprises at least one upwardly facing internal ledge following an undulating path along the interior of the container side wall, a plurality of upwardly extending internal ribs spaced-apart along the container side wall above the ledge, and a plurality of openings through the container side wall in communication with low points in the undulating path of the ledge.

The plurality of upwardly extending internal ribs serve to deter root circling around an interior surface of the container side wall in a region that may be smooth and otherwise uninterrupted. The length, position and configuration of the upwardly extending internal ribs may vary while still serving to deter root circling. However, the internal ribs preferably extend upwardly from the ledge, leaving no gap there between where a root could pass through and continue circling. More preferably, the plurality of upwardly extending internal ribs extend upwardly from the ledge at the high points in the undulating path of the ledge so that the intersection between a rib and the ledge does not form a feature that would trap roots downwardly deflected by the rib, but rather the intersection will allow the continued deflection of the root toward the air pruning opening. With the rib upwardly extending from a high point of the ledge, a downwardly deflected root may encounter and follow the downwardly sloping ledge, most preferably a continuously downwardly sloping ledge, away from the rib until coming into communication with an opening where the root is air pruned.

The internal ribs may be narrow or wide, and straight, curved or angled. In one embodiment, the upwardly extending internal ribs have two legs forming an angled peak there between. For example, two legs of the upwardly extending ribs may have a greater longitudinal slope (i.e., greater slope along the length of the ribs) than the ledge or wherein the legs of the upwardly extending ribs form an acute angle there between. The longitudinal slope of the ribs is preferably between 1.5 and 15 degrees off vertical (i.e., a vertical axis of the upright container), and most preferably between 1.5 and 10 degrees off vertical. One leg forms a rib surface facing in one direction to stop roots circling from that direction and the other leg forms an opposing rib surface facing the opposing direction to stop roots circling from the opposing direction. Each leg would preferably integrate with the adjacent portion of the ledge to form a continuous shoulder. A great advantage of the rib having two legs is that this allows the container to achieve a significant degree of nested stackability. Furthermore, the two legs provide additional strength to the container and the sloping legs reduce the angle formed between the rib and the ledge. Small or gradual changes in this angle are preferred because this increases the degree of control over the root direction.

The container and the container side wall may be any curvilinear or polygonal shape, but is preferably circular or rectangular. In one embodiment, the container side wall has corners, such as in a rectangular container, and the openings are positioned at the corners. A particular advantage of this configuration is that the undulating ledge may form a path that is not only sloped downward, but is simultaneously outwardly extending relative to the axial center of the container. This downward and outward path is more accommodating to the natural downward and outward path of lateral roots than a downward sloping ledge around a circular container side wall. In such an embodiment, it is also preferred to include at least one upwardly extending rib between each corner. Still further, an upwardly extending rib may be disposed in each of the corners.

The container may comprise a plurality of the upwardly facing internal ledges in a spaced relationship one above the other. Accordingly, roots may be air root pruned at more than one elevation within the container. It is particularly advantageous that the ledges deter roots from extending down the container side wall and the upwardly extending ribs deter roots from circling around the interior of the container side wall. Embodiments having a plurality of upwardly facing internal ledges will preferably include a first ledge and a second ledge that is adjacent and above the first ledge, and wherein the upwardly extending rib of the first ledge extends upwardly to an elevation that is higher than the low point of the second ledge. This arrangement of first and second ledges in combination with upwardly extending ribs may be characterized in that there is no horizontal cross-section of the container side wall that does not intersect either a ledge or rib. More preferably, a horizontal cross-section of the container side wall would intersect either a ledge or a rib every $1/4^{th}$ to $1/8^{th}$ of a turn about the axis of the container. Accordingly, root circling is extremely unlikely to occur, since any root that might begin to grow around the interior surface of the container side wall will encounter either a ledge or rib before it has extended beyond $1/4^{th}$ to $1/8^{th}$ of a turn about the container axis. It should also be recognized that roots may also be downwardly deflected by a corner in the container side wall in much the same way as the upwardly extending ribs. Therefore, a container side wall having corners will further subdivide the container side wall into greater number of localized side wall sections. Furthermore, there is preferably no surface of the container side wall or bottom wall that would tend to cause a root growing in a natural downward and outward direction to begin circling.

Another embodiment of the invention provides a ledge that forms a gutter in order to provide an increase in the number of roots that can utilize the ledge before the ledge is completely filled with roots and can no longer guide roots to an opening to be root pruned. While it is generally the case that a nursery plant must eventually be transplanted into a larger container, transplanted into the landscape or be discarded, it is possible to extend that eventuality using ledges in the form of a gutter. One way to form such a ledge is to slope the ledge downwardly in a transverse direction relative to the path of the ledge and toward the upper adjacent portion of the container wall. Accordingly, the wall and ledge might form a "V-shaped" gutter, although the important factor is the root capacity of the gutter not the specific shape of the gutter. The ledge preferably slopes downwardly in the transverse direction at an angle of between about 20 to 60 degrees with respect to horizontal, and more preferably between about 35 to 45 degrees with respect to horizontal. Alternatively or in combination with such a sloped ledge, the ledge may comprise an upwardly extending lip on the inner edge of the ledge forming a gutter. Such a ledge might form a somewhat "U-shaped" gutter. A preferred gutter for use with seedling plants has a width of between $1/16^{th}$ and $5/16^{th}$ of an inch, most preferably about $3/16^{th}$ of an inch wide, and/or a depth of between $1/16$" to $3/16$". Optionally, the lip may be tapered along the length of the ledge, so that the ledge has regions with a taller lip to provide more root capacity where the largest number of roots is likely to be and other regions with a shorter lip. Generally, greater root capacity is needed near a low point in the undulating ledge since all of the roots that have been collected along the length of a downwardly sloping section of the ledge are directed in that direction.

The bottom wall of the container preferably has one or more roof-like peaks to direct a taproot into a bottom wall opening. To further deter root circling against the side wall adjacent the bottom wall, the container may further include a plurality of ribs extending upwardly along the container side wall from the base of the side wall to an elevation higher than the low point of the adjacent ledge (i.e., the first ledge above the container base). The container "base" is that portion of the container that contacts a support surface when the container is in its operable, upright position. The container "bottom wall" is that portion that retains a growth medium from downwardly out of the container when the container is in its operable, upright position. In various embodiments, the base may comprise a portion of the bottom wall, a portion of a side wall, or both. Generally the base should provide sufficient structure to support the container in a stable, upright position.

Yet another embodiment of the invention provides a container flat for growing plants. The container flat comprises a plurality of joined containers, each container being made in accordance with one of the foregoing embodiments. The containers are preferably joined near an upper edge of the side wall. Such flats may have any number of individual containers. While a flat should have a stable base structure, perhaps collectively formed by portions of the individual container structures, it is not necessary that the individual containers within a flat have an independent base that would be stable if the containers were separated.

Embodiments of the container of the present invention may take various overall shapes, which may be described as generally inverted and truncated pyramidal or conical shapes. However, specific embodiments of the container may also be described in other terms. For example, certain embodiments of the container may be described in more specific terms as a series of generally concentric, hollow frustums of cones or pyramids, with successive frustums having a reduced diameter and being connected by an interiorly directed ledge. Furthermore, it should be recognized that the primary benefit of the containers having a tapered side wall forming each of the frustums is the increased degree of nested stacking that is accommodated between two or more of such containers or flats. However, the air-root-pruning benefits of the containers according to the present invention can still be realized with a substantially vertical sidewall in each section or frustum coupled by a ledge. It should also be recognized that the boundary or interface between adjacent frustums is preferably an undulating boundary or interface that follows a ledge. In other words, the preferred containers have an undulating ledge that forms the connecting interface between adjacent frustums.

Figure 1:
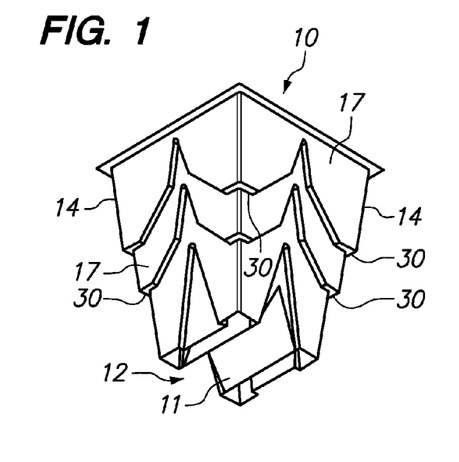
FIG. 1 is an exterior perspective view of a container for growing plants in accordance with the present invention.

FIG. 1 is an exterior perspective view of a container 10 for growing plants in accordance with the present invention. The container 10 includes a lower end or base 12 and an upwardly extending side wall 14. The side wall 14 is substantially closed, meaning that it forms a substantially continuous perimeter of the container 10. The side wall 14 is joined to a bottom wall 11 for containing growth media, but the container 10 has an open top for inserting and removing the growth media and a seed or plant. The side wall 14 includes an outside surface 17 and an inside surface 15 (See FIG. 2) that contacts the growth medium, such as soil, dirt, sand, or combinations thereof. As a general matter, the side wall 14 of the container 10 may be described as having a generally inverted truncated pyramidal shape.

Figure 2:
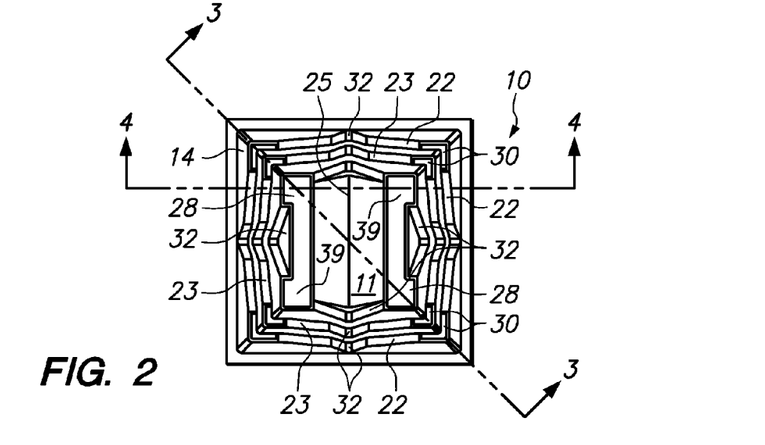
FIG. 2 is a top view of the container of FIG. 1.

FIG. 2 is a top view of the container 10. The side wall 14 of the container 10 includes two upwardly facing internal ledges 22, 23 formed in the side wall 14. A first ledge 22 is spaced above a second ledge 23, and each of the ledges 22 extends along the side wall 14 of the container 10. Each of the ledges 22, 23 follows an undulating path around the side wall 14. That is, each of the ledges 22, 23 is longitudinally sloped (i.e., sloped along the length of the ledge) upward and downward to form a plurality of high points and a plurality of low points. Air pruning openings 30 are positioned in communication with the low points of the ledge's undulating path, in order to receive roots that have extended along the gutter or ledge. The openings 30 may be formed through an upwardly extending portion of the side wall 14, through a ledge 22, 23, or a combination thereof. As illustrated, the openings 30 are positioned at each corner of the rectangular container 10. Between each of the openings 30, the ledges 22, 23 are interrupted by an upwardly extending rib 32.

The bottom wall 11 is also shown spanning between the opposing portions of the sidewall 14. The bottom wall 11 has a roof-like surface forming a peak 25 down the center in order to direct a tap root or other downwardly directed root to one of the openings 28 through the bottom wall where the root is air pruned. Many other configurations of a bottom wall can be envisioned. Furthermore, it is preferred to include upwardly extending ribs 32 on the side wall 14 from the base edge of the side wall in order to deter root circling.

Figure 3:
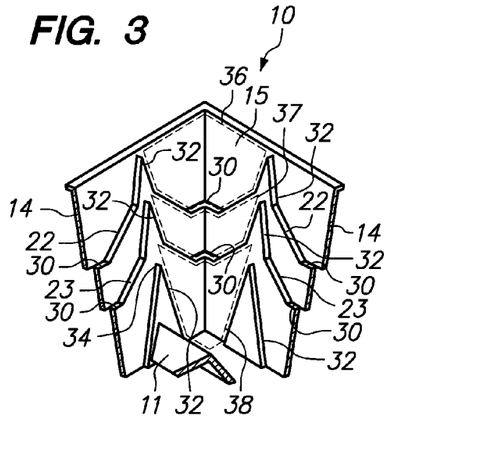
FIG. 3 is a cutaway perspective view of the interior of the container of FIG. 2 taken along line A-A.

FIG. 3 is a cutaway perspective view of the interior of the container 10 taken along line A-A of FIG. 2. The side wall 14 includes the first ledge 22, the second ledge 23, upwardly extending ribs 32, and the bottom wall 11. As shown well in FIG. 3, the ledges and ribs are configured to prevent a root from finding an uninterrupted path in which the root could circle. Specifically, the rib 32 upwardly extending from one ledge (or from the base of the sidewall) extends upward to an elevation higher (such as at point 34) than the low point of the next higher ledge (such as at openings 30). The uppermost rib 32 will preferably extend upward near to the upper edge of the sidewall. Roots will make contact with the side wall and be directed to a nearby air pruning opening 30. For illustration only, it may be considered that the sidewall 14 is divided into sections, for example including dashed sections 36, 37, 38, that are capable of receiving roots and directing those roots to corresponding openings 30. Although all sections are not shown, the entire interior of the side wall is effectively sectioned off in this manner to effectively air prune roots at various elevations and radial directions. This improves the health of the plant before and after transplant as discussed above. In the embodiment shown here, the corners serve to further subdivide the sections 36, 37, 38 so that the full container 10 would have a side wall that is subdivided into 24 sections (i.e., 4 sides×2 columns of sections/side×3 rows of sections/column).

Figure 4:
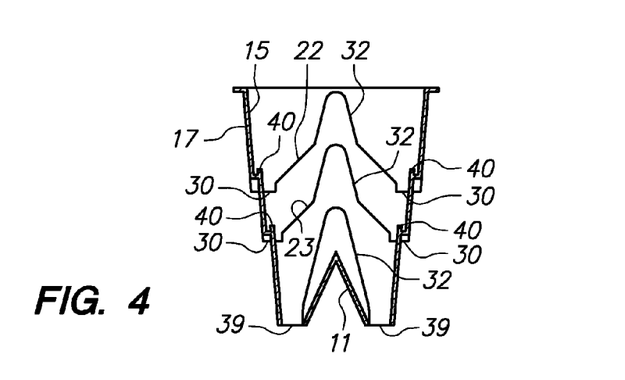
FIG. 4 is a cross-sectional side view of the container of FIG. 2 taken along line B-B.

FIG. 4 is a cross-sectional side view of the container 10 taken along line B-B of FIG. 2. The longitudinal slope of the ledges 22, 23 and the upwardly extending ribs 32 is shown. Roots engaging the ribs 32 are directed downward. The ledges 22, 23 direct roots to an adjacent opening 30 which is located a low point of the ledge. The high point of each rib 32 is shown clearly extending to an elevation at least as high as the low point of the adjacent ledge, if any. The upper most rib extends very nearly to the top of the container. The lowest rib 32 extends upward from the lowest edge of the side wall. The bottom wall 11 and the side walls direct roots to the openings 39 to be air pruned without forming any features where the root can become trapped or circle.

The portion of the ledges 22, 23 that are shown from the side have been formed with a lip 40 to form gutters that will hold more roots than an "L-shaped" ledge of the same width. It should be recognized that the ledges and ribs may all have the same profile as these gutters regardless of their longitudinal slope or position within the container.

Figure 5:
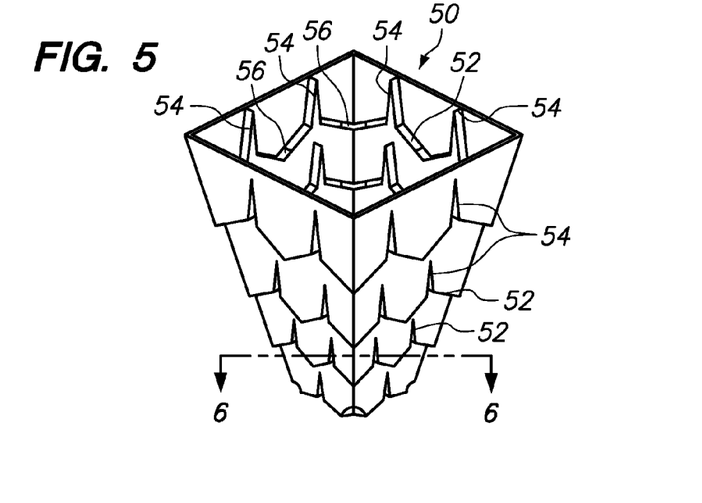
FIG. 5 is a perspective view of a further container having three ledges, with each ledge having a plurality of upwardly extending ribs.

FIG. 5 is a perspective view of a further container 50 having three ledges 52, with each ledge 52 having a plurality of upwardly extending ribs 54. As with the container 10 of FIGS. 1-4, the ribs 54 extend upwardly from the high points of each of the three undulating ledges 52 as well as extending upward from the bottom of the container. Furthermore, an air pruning opening 56 is positioned in communication with each of the low points of the ledges 52. As shown, the openings 56 are positioned in the corners of the rectangular container as well as at a midpoint of each side of the rectangle. In either case, the openings 56 extend through the upwardly facing surface of the ledge between opposing ribs 54.

The upwardly extending ribs 54 of container 50 are narrower than the ribs 32 of container 10 of FIGS. 1-4. Narrow ribs have a smaller flat, inwardly facing surface that might deflect a root in a less desirable, uncontrolled direction. Still, the narrow ribs are illustrated as having a pitch that is sufficient to allow efficient stacking of containers and allow effective release of the container from an injection mold during manufacturing. Accordingly, the pitch or slope of the ribs is preferably from 1.5 degrees to 10 degrees off of vertical. Keeping the longitudinal slope of the rib near vertical also reduces the opportunity for a root to deflect upward after contacting the rib.

Figure 6:
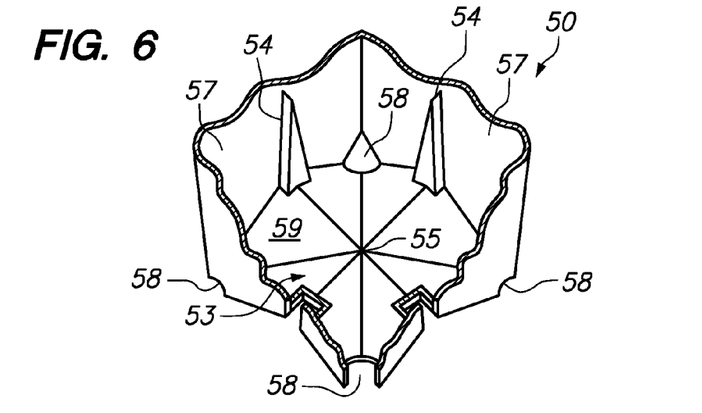
FIG. 6 is a cutaway perspective view of the bottom wall of the container of FIG. 5, with four equally spaced lower openings positioned in the corners at the intersection of the bottom wall and the side wall.

FIG. 6 is a cutaway perspective view of the bottom wall of the container 50 of FIG. 5, with four equally spaced lower openings 58 positioned in the corners at the intersection of the bottom wall 53 and the side wall 57. The pyramidal bottom wall 53 includes an apex 55 and eight flat triangular sides 59 extending in all radial directions from the apex 55 to the side wall 57. Each of the lower openings 58 is formed in the side wall 57 as well as in portions of adjacent triangular sides 59 forming the bottom wall 53. In one configuration, each side 59 of the pair of adjacent sides 59 which are adjacent to an opening 58 slopes downwardly toward the opening 58 from the apex 34 and from the intersection with an adjacent side 59.

It should be recognized that the containers 10, 50, above, may also be designed to have a circular cross-sectional shape without requiring any further changes to the ledges, ribs, bottom wall, etc. The upwardly facing, internal ledges would simply follow an undulating path along the circular side wall. Openings would be spaced about the perimeter of the circular side wall.

A growth medium is placed in any of the containers of the present invention, and a seed or seedling is planted in the growth medium. The description of the method which follows will refer to the container 10, but it is to be understood that the method applies equally to other alternatively configured containers of the present invention.

The tap root formed by the plant in the growth medium rapidly extends to the bottom wall 11 of the container 10. Upon contact with the bottom wall 11, the tap root may follow the sloping sides to one of the openings 39, or into contact with the side wall 14 of the container 10 and then to one of the openings 30. Upon extending through an opening 39, 30, the tip of the tap root is air-pruned, wherein the portion of the root extending into the air is pruned by desiccation. When the tap root growth is thus terminated, secondary lateral roots are developed along the length of the tap root within the container.

The secondary lateral roots grow outwardly from the tap root towards one or more of the side walls 14 of the container 10. Upon reaching and contacting the inside surface 15 of the side wall 14, the lateral roots continue to grow with the root tip extending downwardly along the side wall 14 until coming into contact with one of the ledges 22, 23. The particular ledge then guides further growth of these lateral roots towards the openings 30, causing the root tips to extend through the openings 30 and to be air-pruned. As the lateral roots are air-pruned, additional lateral roots grow from the existing lateral roots. The additional lateral roots are likewise guided downwardly by the side wall 14 until they make contact with one of the ledges, and continue to grow along the ledges to the openings where they are also air-pruned. Root branching again occurs from the newly air-pruned roots, and the cycle of existing roots growing, air pruning, and developing new lateral roots continues.

The method and container of the present invention may thus result in the rapid and healthy growth of a plant having a root system with many root tips positioned at all levels along the side wall of the container. Upon transplantation, new root growth extends from the root tips in all directions and multiple levels around the plant, quickly anchoring the plant and allowing the roots to obtain water, nutrients and aeration required for additional plant growth.

As can be appreciated from the above description, the ledges according to the invention play an important role in guiding roots to openings for air pruning. The attributes of the ledges largely determine their manner and effectiveness of guiding roots, therefore affecting the overall growth performance of a plant. The ledges generally follow an undulating path, as described previously, in that each upwardly facing ledge slopes upward and downward over the longitudinal length of the ledge as it extends along the perimeter of the container side wall.

Figure 7:
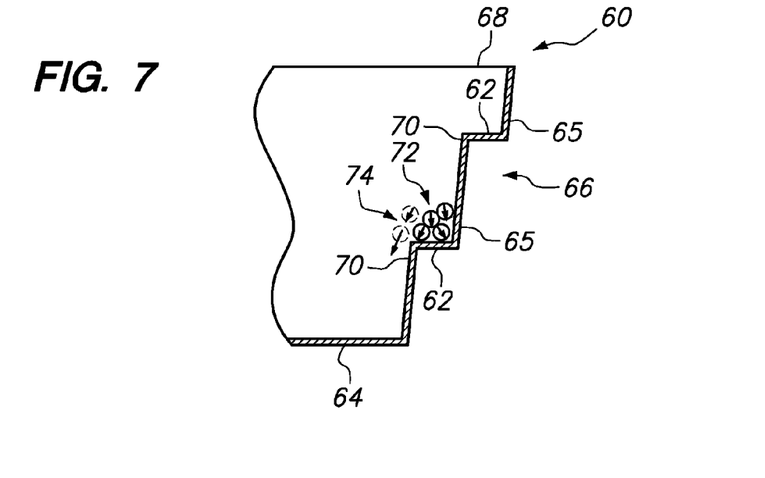
FIG. 7 is a schematic side view of a plant container having two upwardly facing ledges.

FIG. 7 is a schematic side view of a plant container 60 having two upwardly facing ledges 62. Many of the details of the containers 10, 50 of the present invention have been left out of FIGS. 7-11 in order to focus on specific attributes of a ledge. A container 60 having a side wall 66 extends upwardly from a bottom wall 64 to an upper end 68 of the side wall. The plant container 60 may have a generally rectangular, circular, or other horizontal cross section. With the container positioned upright on a flat, horizontal surface, the ledges 62 are shown having a substantially horizontal transverse cross-section (i.e., the ledge cross-section as shown from an adjacent interior portion 70 of the container wall 66 to an adjacent portion 65 of the container wall 66 above the particular ledge 62.)

The upwardly facing internal ledges 62 of FIG. 7 guide a number of roots 72 in a direction along the container wall 66 (generally into the page). The cross-sections of the roots 72 are represented as having a uniformly sized circular shape, although roots may vary in size and degree of circularity. Also, a greater or lesser number of roots may be carried on the ledge 62, depending on the dimensions of the ledge, the type and age of the plant, and so forth. The number of roots that can be carried depends, in part, on the effective diameter of the roots relative to the width of the ledges 62. Generally, the narrower the roots, the greater the number of roots that may be carried on the ledges 62. Arrows are drawn near the roots 72 to indicate a predicted direction of forces as the roots nest on top of each other.

As represented by the two dashed circles, additional roots 74 cannot fit on the ledge 62 when already occupied by the roots 72. Instead, the additional roots 74 tend to grow past and deviate from the ledge 62 and then extend downward elsewhere inside the plant container 60. Although the plant container 60 may produce a healthy, thriving plant by virtue of the ledges 62 guiding some of the roots 72 to openings to be air pruned, the additional roots 74 are not retained and guided by the ledge 62 and may not be air pruned. Rather, the additional roots 74 will continue growing within the container 60 and may or may not find an alternate path to an opening for air pruning, during which time the roots may meander indefinitely through the plant container 60. This situation prevents or at least delays the opportunity for the roots 74 to form more secondary lateral roots, preventing the plant from reaching its optimal growth performance.

According to another aspect of the invention, an improved plant container may be provided that includes a gutter extending along the container wall. Generally, a gutter may be described as a trough or groove to catch and direct something. When applied to optimizing root growth within a plant container, according to the invention, a gutter may be used to intercept roots and guide them to openings for air pruning. A gutter takes advantage of the geotropic nature of plants in that, once intercepted, a plant root has a tendency to seat securely within the gutter, and will have less of a tendency to avoid or grow off of the ledge on its own accord, as compared with containers that merely have a flat ledge, such as the upwardly facing ledge configuration 62 of FIG. 7.

Figure 8:
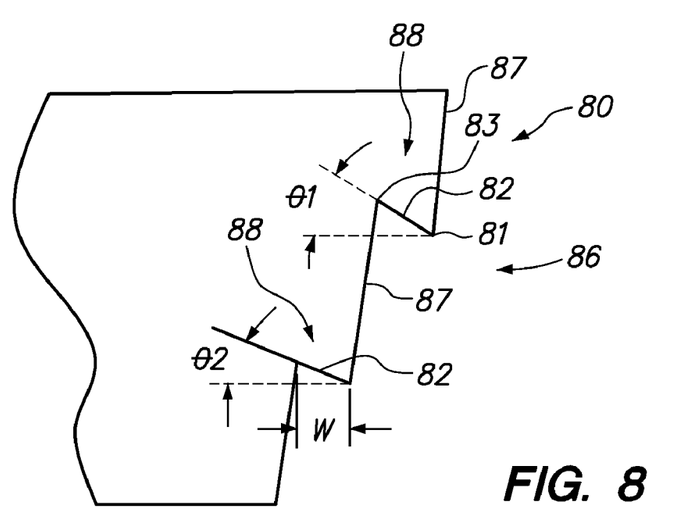
FIG. 8 is a simplified schematic side view of another embodiment of a plant container having gutters that slope downwardly and outwardly toward a container wall.

FIG. 8 is a simplified schematic side view of another embodiment of a plant container 80 having gutters 88 that slope downwardly and outwardly toward a container wall 86. The gutters 88 catch or intercept roots growing downwardly along the side wall and direct them to one or more openings (not shown) to be air pruned. The gutters 88 may have an internal width W that is preferably ³⁄₁₆" or more. The root guiding surfaces 82 form angles θ1 and θ2, respectively, with horizontal reference lines or planes. The angles θ1 and θ2 that define the transverse slope of the root guiding surface 82 may each be between 15 and 60 degrees, although it has been determined that a range of about 30 to 45 degrees is especially effective for producing optimal root growth under a wide range of growing conditions. Angles θ1 and θ2 may be equivalent, or may be different. Thus, the root guiding surfaces 82 slope downwardly from an upper, inner edge 83 to a lower, outer edge 81. Each gutter 88 is thereby defined between each root guiding surface 82 and a portion 87 of the container wall 86 above each root guiding surface 82.

Figure 9:
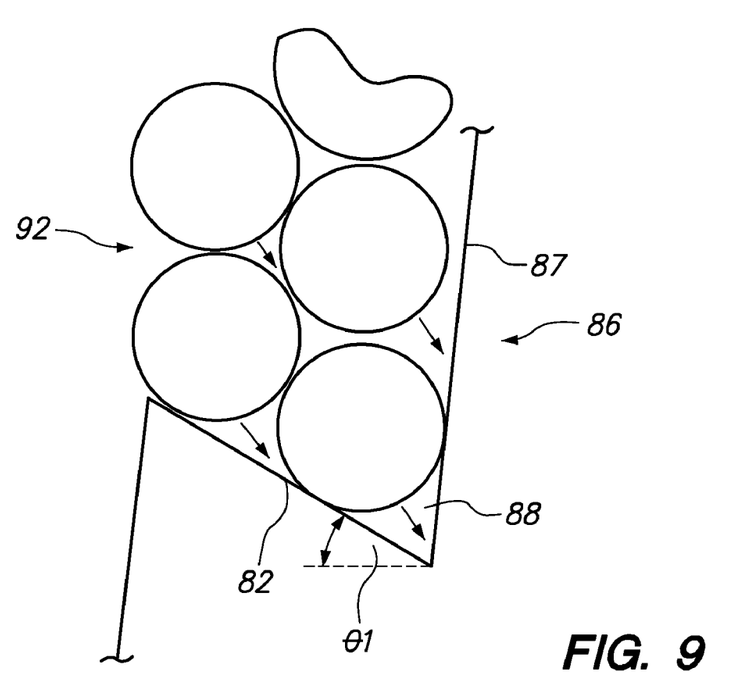
FIG. 9 is a simplified schematic side view of one of the gutters of FIG. 8.

FIG. 9 is a simplified schematic side view of one of the gutters 88 from FIG. 8. The gutter 88 generally extends in a direction along the container wall 86, i.e. generally following the contour of the container wall 86. The gutter 88 thereby guides a group of roots 92 in a direction along the container wall 86. The gutter 88 improves retention of the roots 92 as compared to the substantially horizontal ledges 62 of FIG. 7. Increasing the depth and volume provided by the gutter 88 may increase the number of roots that may be carried. Furthermore, as indicated by arrows drawn near the roots 92, the tendency of the roots 92 is to nest in a direction outwardly and downwardly into the gutter 88, along the downward slope of the root guiding surface 82.

Figure 10:
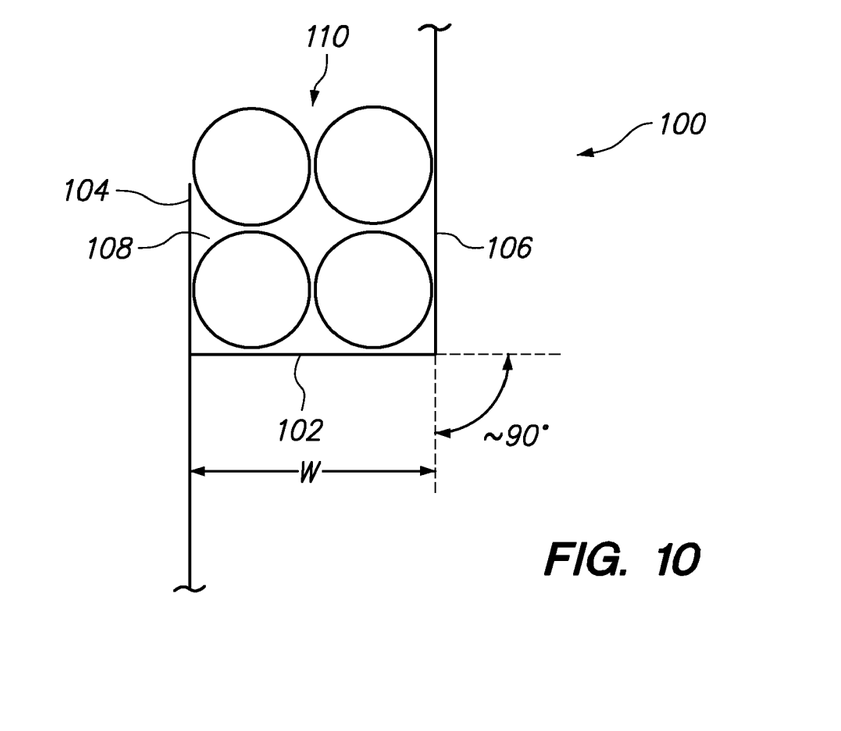
FIG. 10 is a simplified schematic side view of another gutter configuration having a upwardly facing surface with an upwardly extending lip.

FIG. 10 is a simplified schematic side view of another gutter configuration 100 having a upwardly facing surface 102 with an upwardly extending lip 104. The root guiding surface 102 projects substantially horizontally in the transverse direction from a portion of a container wall 106 extending above the root guiding surface 102. A substantially "U-shaped" gutter 108 is thus formed by the root guiding surface 102, the lip 104, and a portion of the container wall 106. The gutter 108 has an internal width W that is preferably 3/16" or more. The gutter 108 helps retain plant roots 110. The height of the lip 104 can be increased to increase the root retention capacity of the gutter.

Figure 11:
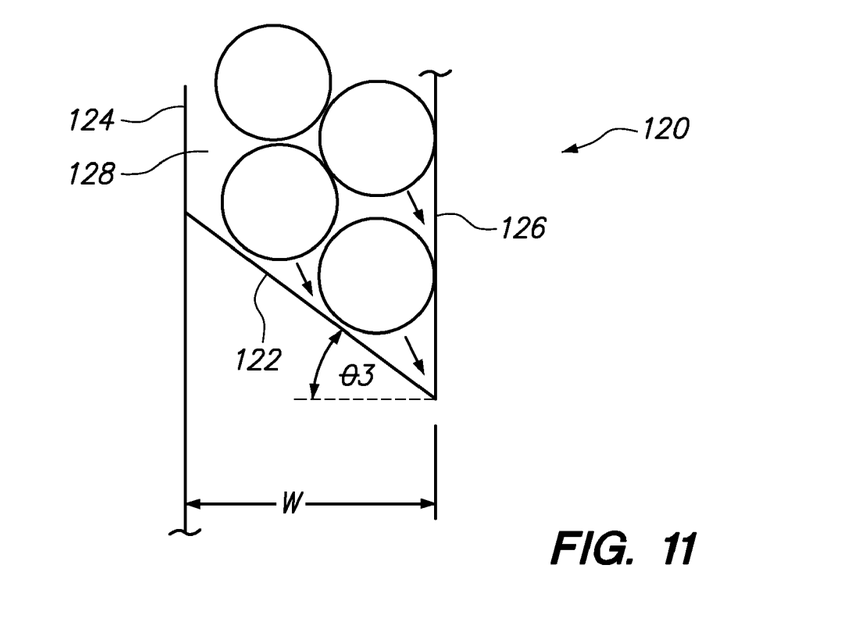
FIG. 11 is a simplified schematic side view of an alternate gutter configuration that combines a downwardly and outwardly sloping root guiding surface with a lip feature.

FIG. 11 is a simplified schematic side view of an alternate gutter configuration 120 that combines a downwardly and outwardly sloping root guiding surface, such as that of FIG. 9, with a lip feature, such as that of FIG. 10. More particularly, a gutter 128 is formed by an inner lip 124, a downwardly and outwardly sloping root guiding surface 122, and a portion of an upwardly extending container wall 126. An angle θ3 between the root guiding surface 122 and a horizontal reference line or plane may be between 15 and 60 degrees, although it has been determined that a range of about 30 to 45 degrees is especially effective for producing optimal root growth under a wide range of growing conditions. The root guiding surface 122 forms an acute angle with the container wall 126 above the root guiding surface 122.

The slope of a gutter in a longitudinal direction along a container wall affects root growth. Although a gutter extending horizontally along a container wall may adequately guide plant roots to the openings, the geotropic nature of plant roots favors having a downward component to root growth. The more a root is allowed to follow its natural tendencies—to grow outwardly and gradually downwardly—the less likely the root is to deviate out of a gutter. A longitudinally sloping gutter is, therefore, more effective in maintaining positioning of the root within the gutter, even when the gutter is narrow or when any lip is minimal. Furthermore, a downward sloping gutter in a direction along a container wall encourages plant roots to grow both outward for lateral stability and downward for reaching higher moisture content within the growth medium. The longitudinal slope of the ledge may be selected to optimize root growth before and after transplanting from the container. The longitudinal slope of the ledge portions is preferably from 20 to 60 degrees off horizontal, but is most preferably 35 to 45 degrees off horizontal.

A variety of containers and ledge configurations have been described above, and others may be determined by one skilled in the art having consideration of this disclosure. It may be observed that other ledge configurations and containers may be constructed according to the invention without departing from the invention. For example, while U-shaped and V-shaped gutters have been described, other gutter shapes and configurations may be devised. The gutters may be formed as a unitary structure with a container wall. Alternatively, the gutters may be coupled or fastened after forming a separate container wall. Thus, for example, a gutter may be described as projecting from a container wall, or portion thereof, even though the gutter and the container wall may be formed as a unitary structure. The containers may have rectangular, round, triangular, or other horizontal cross sections. Air-pruning openings may be molded into a container wall, or stamped, cut, drilled, punched, or otherwise formed in the container wall. Furthermore, although embodiments described above include a container side wall connected to a bottom wall, other embodiments may include a freestanding container side wall with no bottom wall, such as an open bottom.

Figure 12:
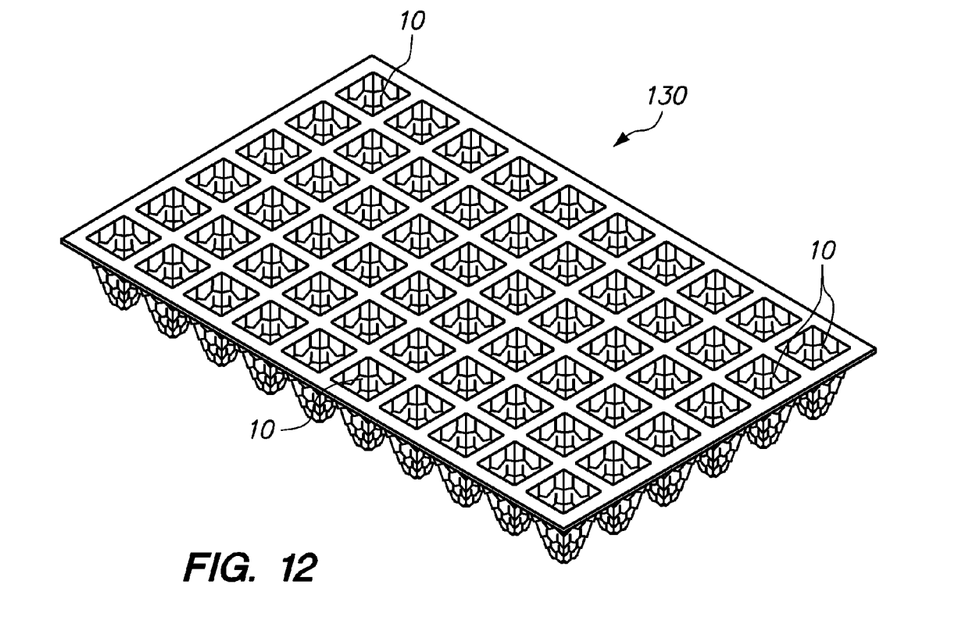
FIG. 12 is a perspective view of a seedling flat comprising a plurality of containers of the present invention.

FIG. 12 is a perspective view of a seedling flat 130 comprising a plurality of containers 10 of the present invention. Furthermore, the seedling flat 130 may include a plurality of any of the containers according to the invention. The seedling flat can be utilized for growing a plurality of plants intended to be transplanted whereby the plants quickly develop the improved root growth described above. Further, the seedling flat as well as individual containers can be economically produced from thermoplastic materials by vacuum forming or the like.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. An air root pruning container for growing a plant, comprising:
an upwardly extending container side wall connected to a bottom wall, wherein the side wall comprises first and second upwardly facing internal ledges following undulating paths along the interior of the container side wall, a plurality of internal ribs spaced-apart along the container side wall extending upwardly from the first and second ledges and a plurality of openings through the container side wall in communication with low points in the undulating paths of the first and second ledges, wherein the second ledge is adjacent and above the first ledge, and wherein the upwardly extending ribs of the first ledge extend upwardly to an elevation that is higher than the low points of the second ledge.

2. The container of claim 1, wherein the plurality of upwardly extending, internal ribs extend upwardly from the first and second ledges at high points in the undulating path of the first and second ledges.

3. The container of claim 2, wherein each ledge slopes continuously downwardly away from each of the ribs until coming into communication with at least one of the plurality of openings.

4. The container of claim 2, wherein the upwardly extending internal ribs have two legs forming an angled peak therebetween.

5. The container of claim 4, wherein the legs of the upwardly extending ribs have a longitudinal slope from 1.5 to 15 degrees off vertical.

6. The container of claim 5, wherein each ledge has a longitudinal slope from 20 to 60 degrees off horizontal.

7. The container of claim 6, wherein the legs of the upwardly extending ribs form an acute angle therebetween.

8. The container of claim 2, wherein the upwardly extending ribs extend substantially vertically.

9. The container of claim 2, wherein the upwardly extending ribs extend vertically.

10. The container of claim 1, wherein the side wall has corners and the plurality of openings are positioned at the corners.

11. The container of claim 10, wherein the plurality of upwardly extending internal ribs comprise at least one upwardly extending rib between each corner.

12. The container of claim 10, wherein the container is rectangular.

13. The container of claim 1, wherein the container is nestedly stackable.

14. The container of claim 1, characterized in that the first and second ledges deter roots from extending down the container side wall and the upwardly extending ribs deter roots from circling around the container side wall.

15. The container of claim 1, characterized in that there is no horizontal cross-section of the container side wall that does not intersect a ledge or rib.

16. The container of claim 1, wherein the container wall has corners, the one or more openings are disposed at the corners, and the first and second upwardly facing internal ledges slope downwardly toward the corners.

17. The container of claim 1, wherein the first and second ledges slope downwardly in a transverse direction toward an upper adjacent portion of the container side wall.

18. The container of claim 17, wherein the first and second ledges slope downwardly in the transverse direction at an angle of between about 20 to 60 degrees with respect to horizontal.

19. The container of claim 17, wherein the first and second ledges slope downwardly in the transverse direction at an angle of between about 35 to 45 degrees with respect to horizontal.

20. The container of claim 1, wherein the first and second ledges comprise an upwardly extending lip forming a gutter.

21. The container of claim 20, wherein the lip is tapered along the length of the first and second ledges.

22. The container of claim 20, wherein the getter has a width of at least about 3/16".

23. The container of claim 20, wherein the gutter has a depth of between about 1/16" to 3/16".

24. The container of claim 20, wherein the gutter has one of a substantially U-shaped cross section and a substantially V-shaped cross section.

25. The container of claim 1, wherein the bottom wall has one or more roof-like peaks to deflect a taproot into a bottom wall opening.

26. The container of claim 25, further comprising:
a plurality of ribs extending upwardly along the container side wall from the bottom wall to an elevation higher than the low point of an adjacent ledge.

27. A container flat for growing plants, comprising:
a plurality of joined containers, each container being made in accordance with claim 1.

28. An air root pruning container for growing a plant, comprising:
an upwardly extending container side wall connected to a bottom wall, wherein the side wall comprises a first upwardly facing internal ledge and a second upwardly facing internal ledge that is adjacent and above the first ledge, the first and second internal ledges following an undulating path along the interior of the container side wall, a plurality of internal ribs spaced-apart along the container side wall extending upwardly from high points in the undulating path of the first and second ledges, and a plurality of openings through the container side wall in communication with low points in the undulating path of the first and second ledges, wherein the upwardly extending ribs of the first ledge extend upwardly to an elevation that is higher than the low points of the second ledge.

29. The container of claim 28, wherein the first and second lodges slope continuously downwardly away from each of the ribs until coming into communication with one of the plurality of openings.

30. The container of claim 28, wherein the upwardly extending internal ribs have two legs forming an angled peak therebetween.

31. The container of claim 28, characterized in that there is substantially no horizontal cross-section of the container side wall that does not intersect a ledge or rib.

32. The container of claim 28, wherein the side wall has corners and the plurality of openings are positioned at the corners.

33. The container of claim 28, wherein the first and second ledges comprises an upwardly extending lip forming a gutter.

34. The container of claim 28, wherein the bottom wall has one or more roof-like peaks to deflect a taproot into a bottom wall opening.

35. The container of claim 34, further comprising:
a plurality of ribs extending upwardly along the container side wall from the bottom wall to an elevation higher than the low point of an adjacent lodge.

* * * * *